Patented Nov. 11, 1941

2,262,198

UNITED STATES PATENT OFFICE 2,262,198

REFRACTORY GLASS

John Henry Partridge, Pinner, England, assignor to General Electric Company, a corporation of New York No Drawing. Application July 19, 1938, Serial No. 220,135. In Great Britain July 19, 1937

2 Claims. (Cl. 106—52)

This invention relates to refractory glasses of the type described and claimed in British patent specification No. 426,129. Its object is to provide glasses having in a yet higher degree than those particularly described in that patent the qualities therein aimed at, namely a high softening point, a low thermal expansion, high electrical resistance and good working properties.

Glasses consisting of silica, lime and alumina alone can have softening points about 950° C. and high electrical resistance. But they devitrify very rapidly when they are worked in a flame. This devitrification is due to the precipitation of anorthite ($2SiO_2.CaO.Al_2O_3$), which has the composition by weight 43.3% $SiO_2$, 20.1% CaO, 36.6% $Al_2O_3$. The discovery on which the invention rests is that if the proportion of anorthite in the glass is less than a lower limit, which is about 56%, devitrification will not occur so readily. The proportion of anorthite means the weight of the anorthite that could be formed from the constituents of the glass expressed as a fraction of the weight of the glass. A method of determining whether the proportion of anorthite is greater than $x\%$ is as follows:

Let $s$, $c$, $a$ be respectively the percentages of $SiO_2$, CaO, $Al_2O_3$ in the glass. Calculate, for varying values of $x$, the quantities $s_m = 0.433x$, $c_m = 0.201x$, $a_m = 0.366x$. If $x = 56$, $s_m$, $c_m$, $a_m$ are respectively 24.2, 11.3, 21.0. Then if $s < s_m$ or $c < c_m$ or $a < a_m$, the glass contains less than $x\%$ of anorthite. If one of these three inequalities is fulfilled, but the other two are not fulfilled, then the constituent to which this inequality refers is called the limiting constituent. If $Al_2O_3$ is the limiting constituent, the amount of lime (or silica) required to form anorthite with the alumina is $$c' = \frac{20.1}{36.6} \times a = 0.549a \left( \text{or } s' = \frac{43.3}{36.6} \times a = 1.180a \right)$$

$c - c'$ (or $s - s'$) is then called the percentage of excess lime (or silica).

In order that the glass shall be sufficiently fusible, the silica content must be less than 65%. In order that the thermal expansion shall be less than $5 \times 10^{-6}$, an upper limit must be imposed on the line which will never exceed 20%, and may be as low as 16%; the limit depends on the constituents other than $SiO_2$, CaO, $Al_2O_3$.

According to the invention a refractory glass, having all of the properties (1), (2), (3) of British patent specification No. 426,129, contains less than 56% of anorthite, $Al_2O_3$ being the limiting constituent, less than 65% of silica, but not less than 30% excess silica, less than 20% lime, but not less than 2.5% excess lime.

Other desirable constituents are the other divalent oxides ZnO, MgO, BaO. If present in suitable proportions they make the glass easier to melt in the furnace, and less liable to devitrification in the flame. If such other divalent oxides are present, in appreciable amount say 5% or more, the excess of (ZnO, MgO, BaO, CaO) should be not less than 10%. (The excess of (U, V, W, Z) means $u+v+w+z$, where $u$, $v$, $w$, $z$ are the excesses of the constituents U, V, W, Z. Of course all of any constituent not involved in anorthite is excess.) If as much as 7% of ZnO is present, the excess lime should be not less than 4%, the excess of (ZnO, MgO, BaO, CaO) not less than 13%. MgO, which is particularly effective in preventing devitrification, may be present in amounts up to 8%.

$P_2O_5$ and $ZrO_2$ have somewhat the same effect on devitrification as MgO; but they decrease the electrical resistivity; the amount of ($P_2O_5$, $ZrO_2$) should therefore not exceed 2%. The amount of $ZrO_2$ is also limited because it usually contains iron, which is usually objectionable for optical reasons. If ZnO is present in appreciable amount, the excess of the acid constituents ($SiO_2$, $P_2O_5$, $ZrO_2$) should be not less than 40%.

The following table gives under the numerals 1–5, by way of example, the composition of five glasses according to the invention together with their expansions and softening points determined as in the said specification No. 426,129. The percentage of anorthite and the excess lime and silica are also given.

|  | 1 | 2 | 3 | 4 | 5 |
|---|---|---|---|---|---|
| $SiO_2$ | 58.9 | 59.0 | 56.1 | 58.0 | 56.0 |
| CaO | 14.6 | 15.0 | 15.5 | 15.0 | 15.0 |
| $Al_2O_3$ | 19.0 | 15.0 | 18.0 | 20.0 | 19.0 |
| MgO | 1.0 | 1.0 |  | 3.0 | 6.0 |
| ZnO | 6.9 | 9.0 | 9.5 | 1.0 | 1.0 |
| BaO |  |  |  | 3.0 | 3.0 |
| $P_2O_5$ |  | 1.0 |  |  |  |
| $ZrO_2$ |  |  | 1.4 |  |  |
| Anorthite __percent__ | 51.9 | 41.0 | 49.2 | 54.6 | 51.9 |
| Excess CaO | 4.2 | 6.8 | 5.6 | 4.0 | 4.6 |
| Excess $SiO_2$ | 36.5 | 41.3 | 33.9 | 34.4 | 32.6 |
| Exp. coeff. | 4.6 | 4.6 | 4.64 | 4.6 | $4.8 \times 10^{-6}$ |
| Soft. temp. °C | 960 | 980 | 960 | 990 | 980 |

In view of British patent specifications Nos. 458,881 and 459,065, I desire to point out that in all the glasses particularly described therein lime, and not alumina, is the limiting constituent. In view of British patent specification No. 461,111, I desire to point out that the glass numbered I therein has more than 65% of silica, the glass numbered II has 63% anorthite, the glass numbered III has more than 20% lime.

I claim:

1. A refractory glass consisting of approximately 56 per cent silica, 15 per cent calcium oxide, 19 per cent alumina, 6 per cent magnesium oxide, 1 per cent zinc oxide and 3 per cent barium oxide, said glass being easy to found and having good working properties, having a softening point of approximately 980° C. and an electrical resistance of at least two megohms per centimeter cube at 600° C. and a linear expansion of about $4.8 \times 10^{-6}$.

2. A refractory glass consisting of approximately 58 per cent silica, 15 per cent calcium oxide, 20 per cent alumina, 3 per cent magnesium oxide, 1 per cent zinc oxide and 3 per cent barium oxide, said glass being easy to found and having good working properties, having a softening point of approximately 990° C. and an electrical resistance of at least two megohms per centimeter cube at 600° C. and a linear expansion of about $4.6 \times 10^{-6}$.

JOHN HENRY PARTRIDGE.